(12) United States Patent
Chen et al.

(10) Patent No.: US 10,704,903 B2
(45) Date of Patent: Jul. 7, 2020

(54) BINOCULAR CAPABLE OF MEASURING DISTANCE AND PRISM AND LIGHT TRANSMITTER MODULE THEREOF

(71) Applicants: Sintai Optical (Shenzhen) Co., Ltd., ShenZhen, Guangdong Province (CN); Asia Optical Co., Inc., Taichung (TW)

(72) Inventors: Yue-Ye Chen, ShenZhen (CN); Hua-Tang Liu, ShenZhen (CN); Zhi-Wei Gao, ShenZhen (CN); Sheng Luo, ShenZhen (CN); Jian-Mei Chen, ShenZhen (CN); Ming Zhou, ShenZhen (CN); Ke-Yu Qiu, ShenZhen (CN); Jia-Jun Cao, ShenZhen (CN); Lian Zhao, ShenZhen (CN); Jian Wei, ShenZhen (CN); Jian-Fei Feng, ShenZhen (CN)

(73) Assignees: SINTAI OPTICAL (SHENZHEN) CO., LTD., Shenzhen, Guandong Province (CN); ASIA OPTICAL CO., INC., Taichung (TW)

(*) Notice: Subject to any disclaimer, the term of this patent is extended or adjusted under 35 U.S.C. 154(b) by 308 days.

(21) Appl. No.: 15/686,298

(22) Filed: Aug. 25, 2017

(65) Prior Publication Data

US 2017/0350697 A1 Dec. 7, 2017

Related U.S. Application Data

(63) Continuation-in-part of application No. 15/397,964, filed on Jan. 4, 2017, now Pat. No. 10,520,717.

(30) Foreign Application Priority Data

Mar. 22, 2016 (CN) .......................... 2016 1 0165479
Mar. 13, 2017 (CN) .......................... 2017 1 0146191

(51) Int. Cl.
*G01C 3/04* (2006.01)
*G02B 23/18* (2006.01)
(Continued)

(52) U.S. Cl.
CPC .............. *G01C 3/04* (2013.01); *G01S 7/4812* (2013.01); *G01S 17/08* (2013.01); *G02B 5/04* (2013.01);
(Continued)

(58) Field of Classification Search
CPC ......... G01C 3/04; G01S 17/08; G01S 7/4812; G02B 23/04; G02B 23/10; G02B 23/18; G02B 5/04; G02B 7/06
See application file for complete search history.

(56) References Cited

U.S. PATENT DOCUMENTS 2,910,912 A * 11/1959 Wohler ................... G01C 3/04
356/10
3,484,149 A * 12/1969 Becker ................... G02B 7/28
359/414

(Continued)

*Primary Examiner* — Balram T Parbadia
(74) *Attorney, Agent, or Firm* — McClure, Qualey & Rodack, LLP

(57) ABSTRACT

A prism and light transmitter module includes a prism holder, a light transmitter, a prism module, a drive circuit board, a shield, and a fixing assembly. The light transmitter is configured to emit or receive a light beam along a light axis. The prism module includes an inclined plane and is disposed within the prism holder with the inclined plane exposed. The drive circuit board is disposed above the inclined plane, and intersects with the light axis at a first angle. The shield is disposed on the drive circuit board. The fixing assembly connects to the prism holder, is configured to fix the drive circuit board, and includes a hole through which the light transmitter is exposed. A binocular capable of measuring distance includes a first optical system and a second optical system. The first optical system or/and the (Continued)

A-A second optical system include the prism and light transmitter module.

20 Claims, 12 Drawing Sheets

(51) Int. Cl.
| | | |
|---|---|---|
| G02B 5/04 | (2006.01) | |
| G02B 7/06 | (2006.01) | |
| G02B 23/10 | (2006.01) | |
| G02B 23/04 | (2006.01) | |
| G01S 17/08 | (2006.01) | |
| G01S 7/481 | (2006.01) | |

(52) U.S. Cl.
CPC .............. *G02B 7/06* (2013.01); *G02B 23/04* (2013.01); *G02B 23/10* (2013.01); *G02B 23/18* (2013.01)

(56) References Cited

U.S. PATENT DOCUMENTS

| | | | | |
|---|---|---|---|---|
| 6,236,504 B1* | 5/2001 | Kao | ....................... | G02B 23/18 359/412 |
| 6,292,314 B1* | 9/2001 | Perger | .................... | G02B 23/10 359/638 |
| 6,441,887 B1* | 8/2002 | Kao | ..................... | G01C 15/002 356/4.01 |
| 7,505,120 B2* | 3/2009 | Ing-Song | ................ | F41G 1/473 356/4.01 |
| 8,743,489 B2* | 6/2014 | Perger | .................. | G02B 17/045 359/835 |
| 2001/0026409 A1* | 10/2001 | Kanai | .................... | G02B 17/04 359/833 |
| 2005/0200965 A1* | 9/2005 | Staley, III | .............. | G02B 27/32 359/634 |
| 2007/0211343 A1* | 9/2007 | Clark | ................... | G02B 27/0018 359/577 |
| 2009/0079958 A1* | 3/2009 | Gunther | .................. | G01S 7/481 356/5.01 |
| 2009/0116105 A1* | 5/2009 | Lee | ....................... | G02B 7/1805 359/407 |
| 2009/0174939 A1* | 7/2009 | Heintz | ..................... | F41G 3/02 359/480 |
| 2010/0202048 A1* | 8/2010 | Amitai | ................... | G02B 27/28 359/485.02 |
| 2014/0327902 A1* | 11/2014 | Giger | ...................... | G01S 17/08 356/5.01 |
| 2015/0055116 A1* | 2/2015 | Liu | .......................... | G02B 5/04 356/4.01 |

* cited by examiner

BINOCULAR CAPABLE OF MEASURING DISTANCE AND PRISM AND LIGHT TRANSMITTER MODULE THEREOF

CROSS REFERENCE TO RELATED APPLICATIONS

This application is a continuation-in-part application of U.S. patent application Ser. No. 15/397,964, "Binocular Capable of Measuring Distance and Prism Module Thereof", filed on Jan. 4, 2017, which claims priority to China Patent Application No. 201610165479.3, filed Mar. 22, 2016, all of which are incorporated herein by reference in its entirety.

BACKGROUND OF THE INVENTION

Field of the Invention

The invention relates to a binocular and the prism and light transmitter module thereof, and more particularly to a binocular capable of measuring distance and the prism and light transmitter module thereof.

Description of the Related Art

FIG. 1A depicts a prior binocular capable of measuring distance, with light paths shown. The prior binocular includes a left optical system 10 and a right optical system 20. The right optical system 20 includes a laser diode 52 and an organic light-emitting diode (OLED) 63 configured to produce light containing an image and a reticle message. In operation, the light containing the image and reticle message is reflected by a reflecting mirror 58, enters a prism module 22, is reflected by the prism module 22, and passes through an ocular 26 to be observed by a user. A laser beam B is emitted by the laser diode 52, is reflected by a reflecting mirror 60 to enter the prism module 22, passes through a pentagon prism 222, is reflected by a quadrangle prism 224 (Pechan prism) to leave the prism module 22, and is projected to an object (not shown) through an objective module 24. The object reflects the laser beam B to generate a laser beam C. The laser beam C enters a prism module 12 through an objective module 14 of the left optical system 10, is reflected by a quadrangle prism 124, passes through a pentagon prism 122, is reflected by a reflecting mirror 62, and is received by a laser receiver 54. Visible light beams A, A' respectively pass through the objective modules 14, 24 and Schhmidt-Pechan prisms of the prism modules 12, 22 to form an erect image, and the erect image can be observed through an ocular 16 and the ocular 26. The visible light beams A, A' received by the binocular are utilized to form an erect image of the object for an observation by the user, and the laser beam B emitted by the binocular is utilized to measure the distance from the binocular to the object.

In the structure described above, the laser diode 52 is arranged to be disposed near the ocular 26 so as to avoid the organic light-emitting diode (OLED) 63. However, the arrangement of the laser diode 52 is disadvantageous to the appearance design of the ocular 26. In addition, the laser diode 52 is directly welded on a drive printed circuit board (PCB) (not shown) to reduce loss of large instant current flowing through the laser diode 52. A metallic shield (not shown) is also welded on the drive PCB for preventing the electromagnetic interference (EMI) generated by the laser diode 52. As the laser diode 52, the metallic shield, and the drive PCB are assembled, the volume of the assembly is too large so that the arrangement of the laser diode 52 and the appearance design of the binocular are limited.

FIG. 1B depicts the internal structure of another prior binocular capable of measuring distance, wherein the laser diode 52 and a laser receiver 54 are respectively disposed near objective modules 50, 50'. Because a transmissive-type organic light-emitting diode (OLED) has not been available and a general organic light-emitting diode (OLED) does not meet the requirements, a transmissive liquid crystal display (LCD) is used to be disposed on the light path.

BRIEF SUMMARY OF THE INVENTION

The invention provides a binocular capable of measuring distance and prism and light transmitter module thereof. Since the light source and the light receiver for measuring distance are disposed above or below the prism module through the prism and light transmitter module, the binocular is allowed to use the organic light-emitting diode to generate the reticle. Therefore, the appearance design is optimized by effectively using the space above or below the prism module The prism and light transmitter module in accordance with an embodiment of the invention includes a prism holder, a light transmitter, a prism module, a drive circuit board, a shield, and a fixing assembly. The light transmitter includes a pin, and is configured to emit or receive a light beam along a light axis. The prism module includes an inclined plane and is disposed within the prism holder with the inclined plane exposed. The light beam enters and leaves the prism module. The drive circuit board is disposed above the inclined plane, and intersects with the light axis at a first angle. The pin is bent so as to connect the light transmitter to the drive circuit board. The shield is disposed on the drive circuit board. The fixing assembly connects to the prism holder, is configured to fix the drive circuit board, and includes a hole through which the light transmitter is exposed.

In another embodiment, the fixing assembly includes a base and an elastic plate. The base connects to the prism holder, and includes a connecting part and a supporting part. The connecting part extends in a direction parallel to the light axis. The supporting part intersects with the connecting part at the first angle. The drive circuit board is disposed on the supporting part. The elastic plate includes a fixing part connecting to the base and a free part pressing the shield.

In yet another embodiment, the prism and light transmitter module further includes at least one connecting member. The connecting part includes at least one slot extending in the direction parallel to the light axis. The connecting member passes through the slot, and is disposed on the prism holder so as to connect the base to the prism holder.

In another embodiment, the inclined plane includes an edge close and parallel to the drive circuit board.

In yet another embodiment, the prism module includes a roof prism having the inclined plane and a third prism exposed outside the prism holder so as to receive the light beam emitted by the light transmitter or reflect the light beam to the light transmitter.

In another embodiment, the hole is disposed on the supporting part.

In yet another embodiment, the prism holder includes a light beam channel disposed in front of the light transmitter and extending in the direction parallel to the light axis.

In another embodiment, the first angle ranges from 90 to 170 degrees.

In yet another embodiment, the base further includes a flange disposed at the lower end of the supporting part and having contact with the drive circuit board.

The binocular capable of measuring distance in accordance with an embodiment of the invention includes a first optical system and a second optical system. At least one of the first optical system and the second optical system includes an ocular module, the prism and light transmitter module described above, and an objective module.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
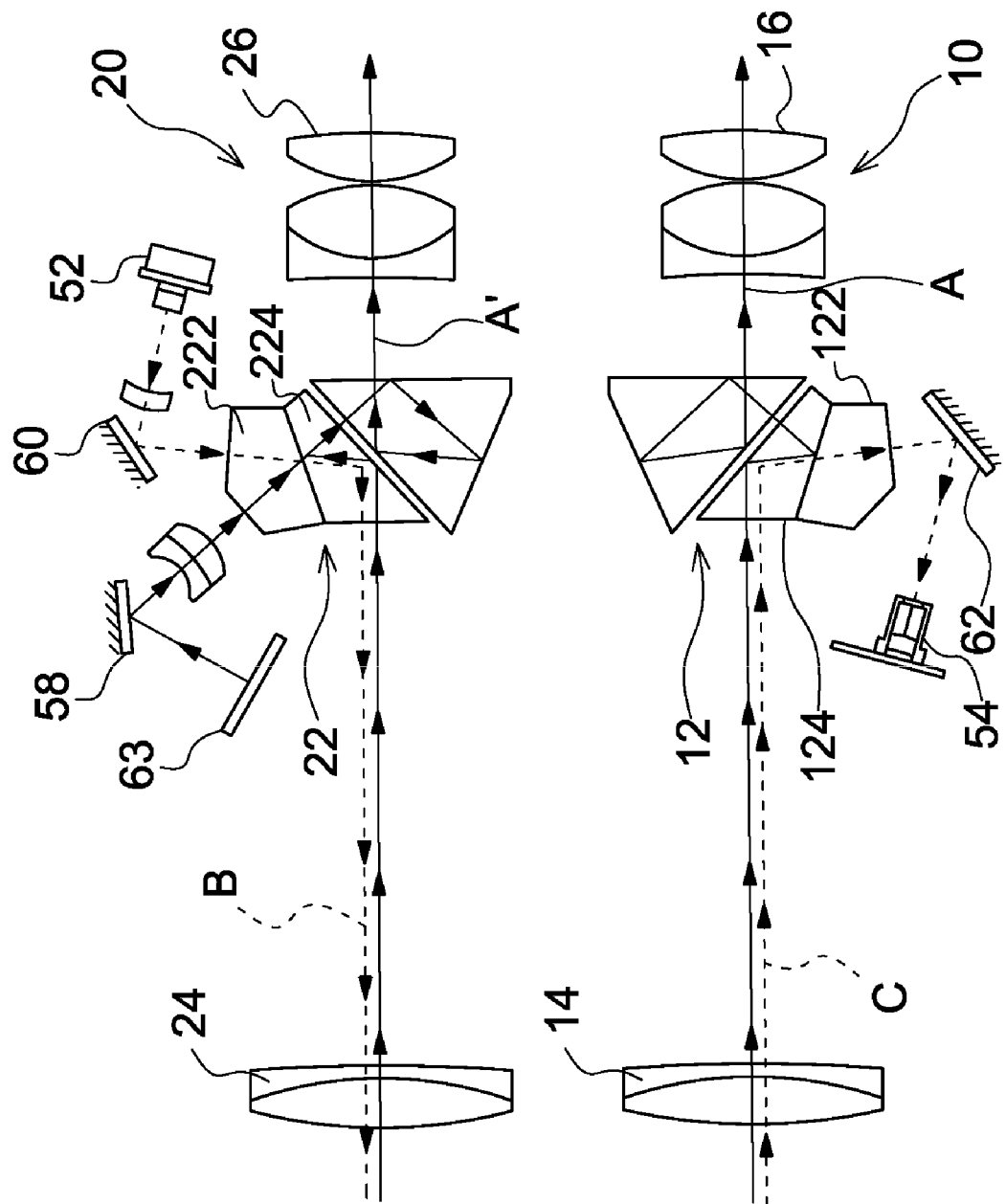
FIG. 1A depicts a prior binocular capable of measuring distance, with light paths shown therein.
Figure 1B:
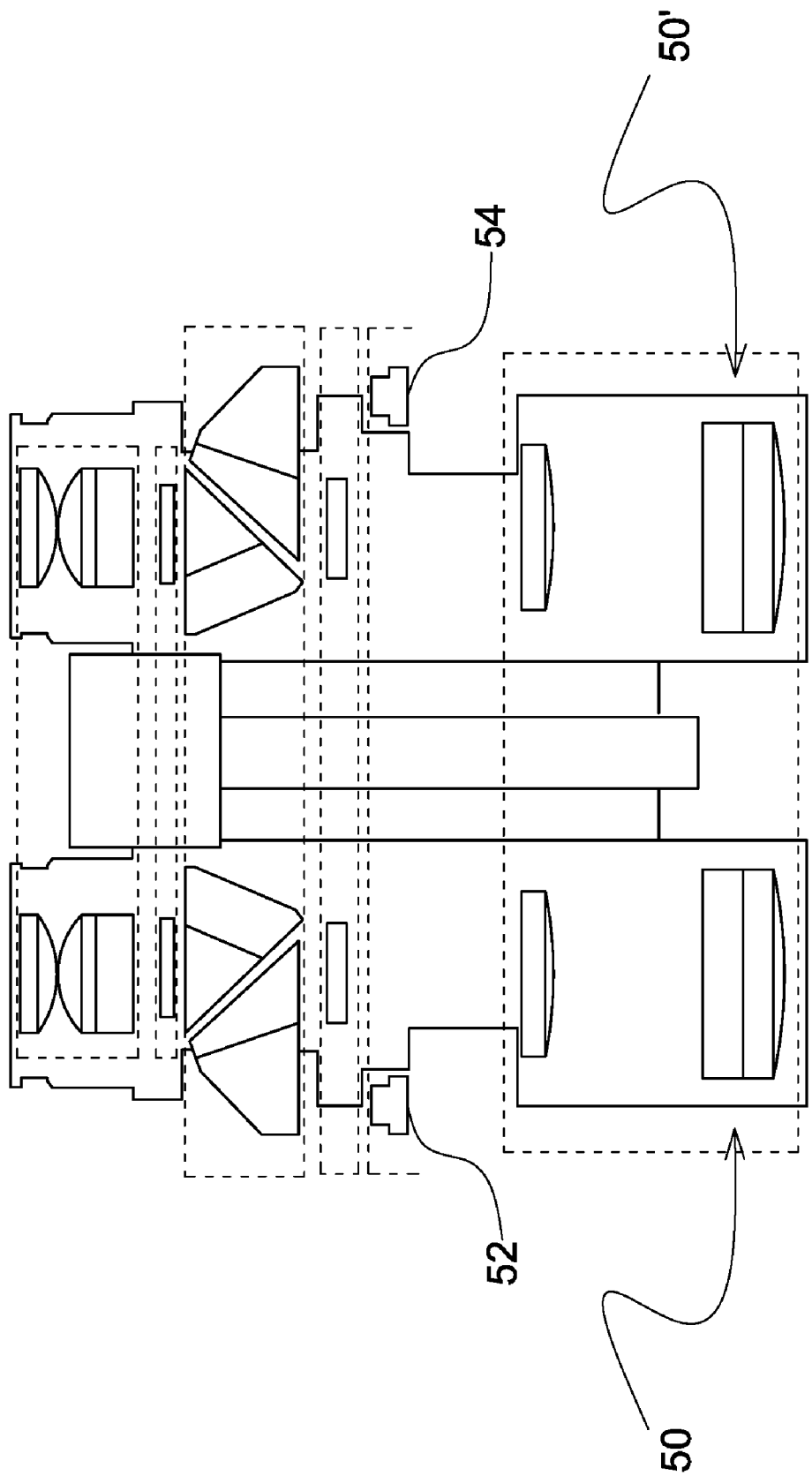
FIG. 1B depicts another prior binocular capable of measuring distance.
Figure 2:
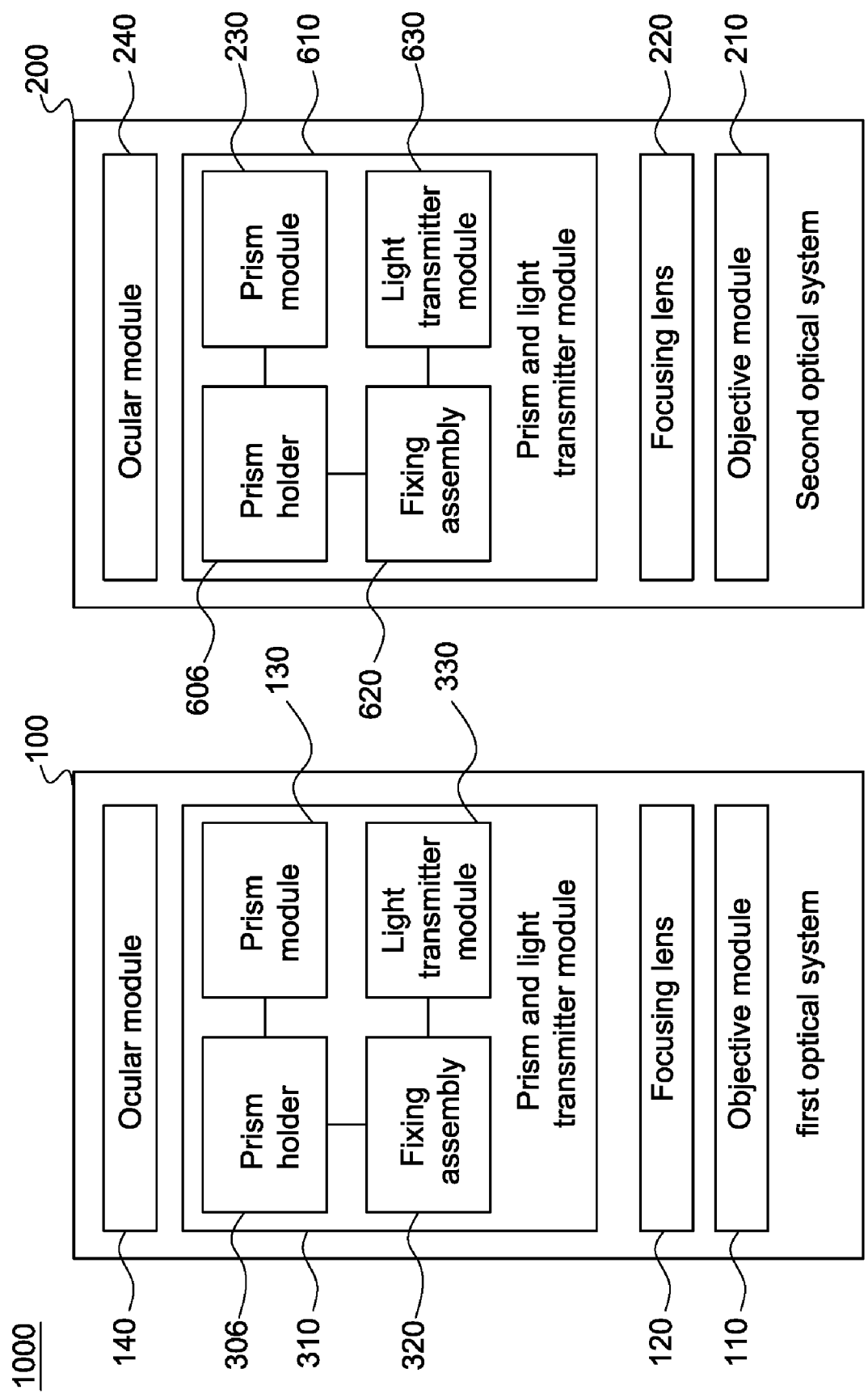
FIG. 2 is a block diagram of a binocular capable of measuring distance in accordance with the invention.

As shown in FIG. 2, a binocular 1000 in accordance with the invention includes a first optical system 100 and a second optical system 200 respectively corresponding to user's right eye and left eye. The first optical system 100 includes an objective module 110, a focusing lens 120, a prism and light transmitter module 310 and an ocular module 140. The second optical system 200 includes an objective module 210, a focusing lens 220, a prism and light transmitter module 610 and an ocular module 240. The prism and light transmitter module 310 includes a prism holder 306, a prism module 130, a fixing assembly 320 and a light transmitter module 330. The prism and light transmitter module 610 includes a prism holder 606, a prism module 230, a fixing assembly 620 and a light transmitter module 630.

The light transmitter module 330 and the light transmitter module 630 respectively include a light source 160 and a light receiver 260 which are shown in FIGS. 3-7 and described in a first embodiment in the following.

Figure 3:
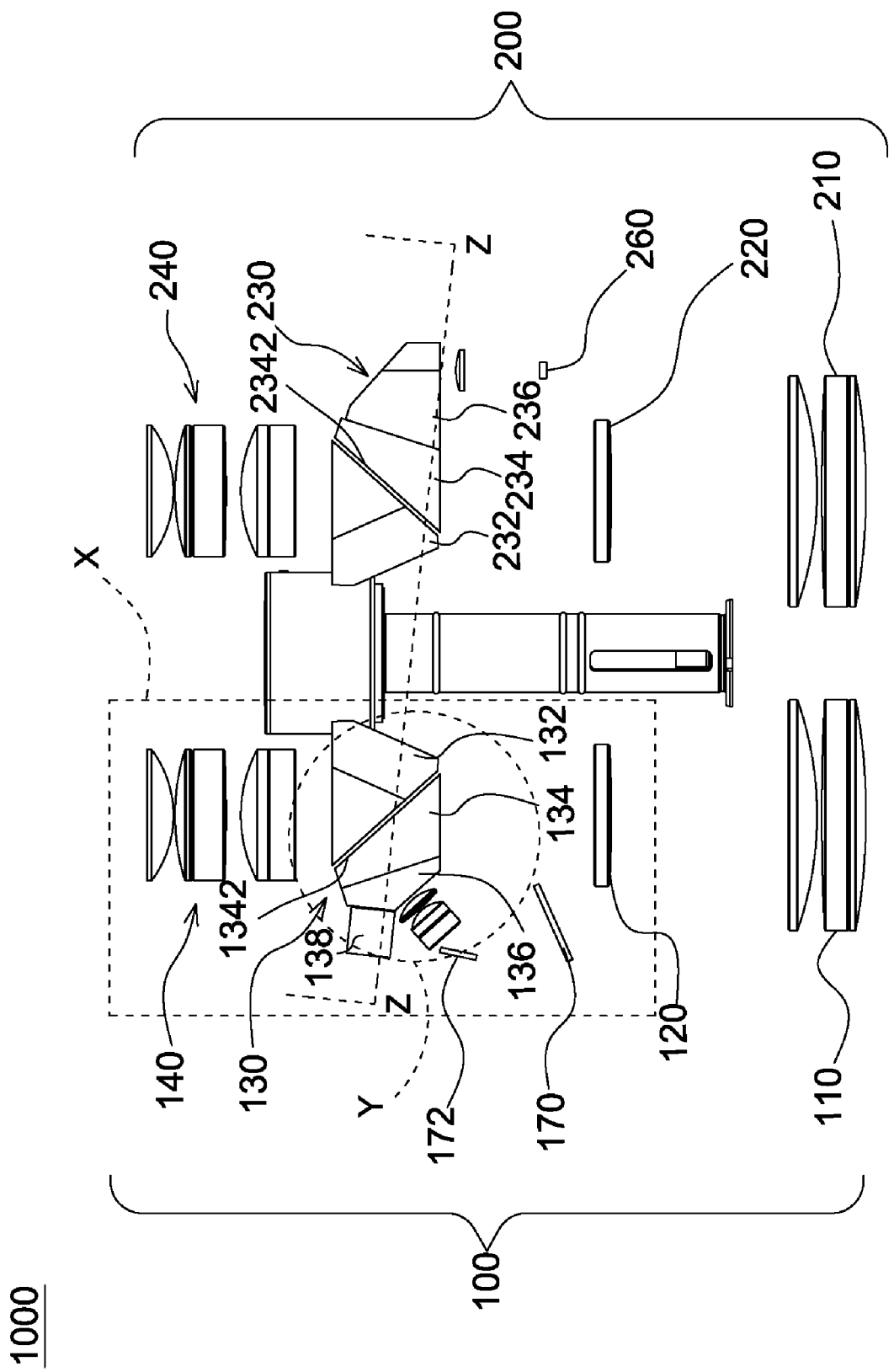
FIG. 3 is a schematic view of a binocular capable of measuring distance in accordance with a first embodiment of the invention.

FIG. 3 depicts the structure of the binocular 1000 in accordance with the first embodiment of the invention, wherein the above-mentioned prism holder 306, fixing assembly 320, prism holder 606, and fixing assembly 620 are omitted so as to clarify the optical design within the binocular 1000. As described above, the first optical system 100 includes the objective module 110, the focusing lens 120, the prism module 130 and the ocular module 140, and the second optical system 200 includes the objective module 210, the focusing lens 220, the prism module 230 and the ocular module 240. In operation, visible light beams pass through the objective modules 110, 210 to form an image. The focusing lenses 120 and 220 are moved to focus the image. The image is transformed into an erect image by the prism modules 130, 230, and the erect image can be observed through the ocular modules 140, 240.

Figure 4:
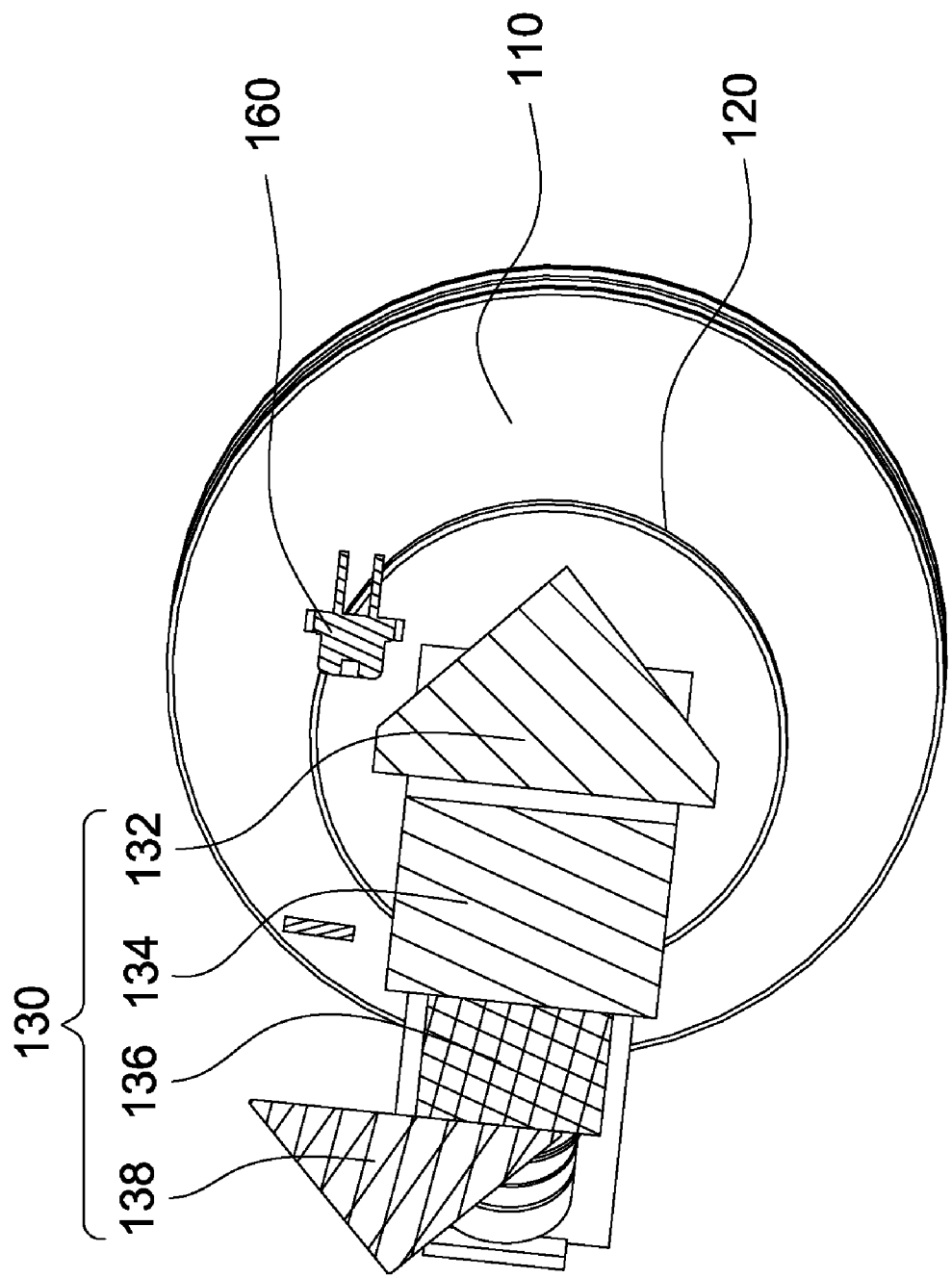
FIG. 4 is a sectional view of the binocular along line Z-Z in FIG. 3.
Figure 5:
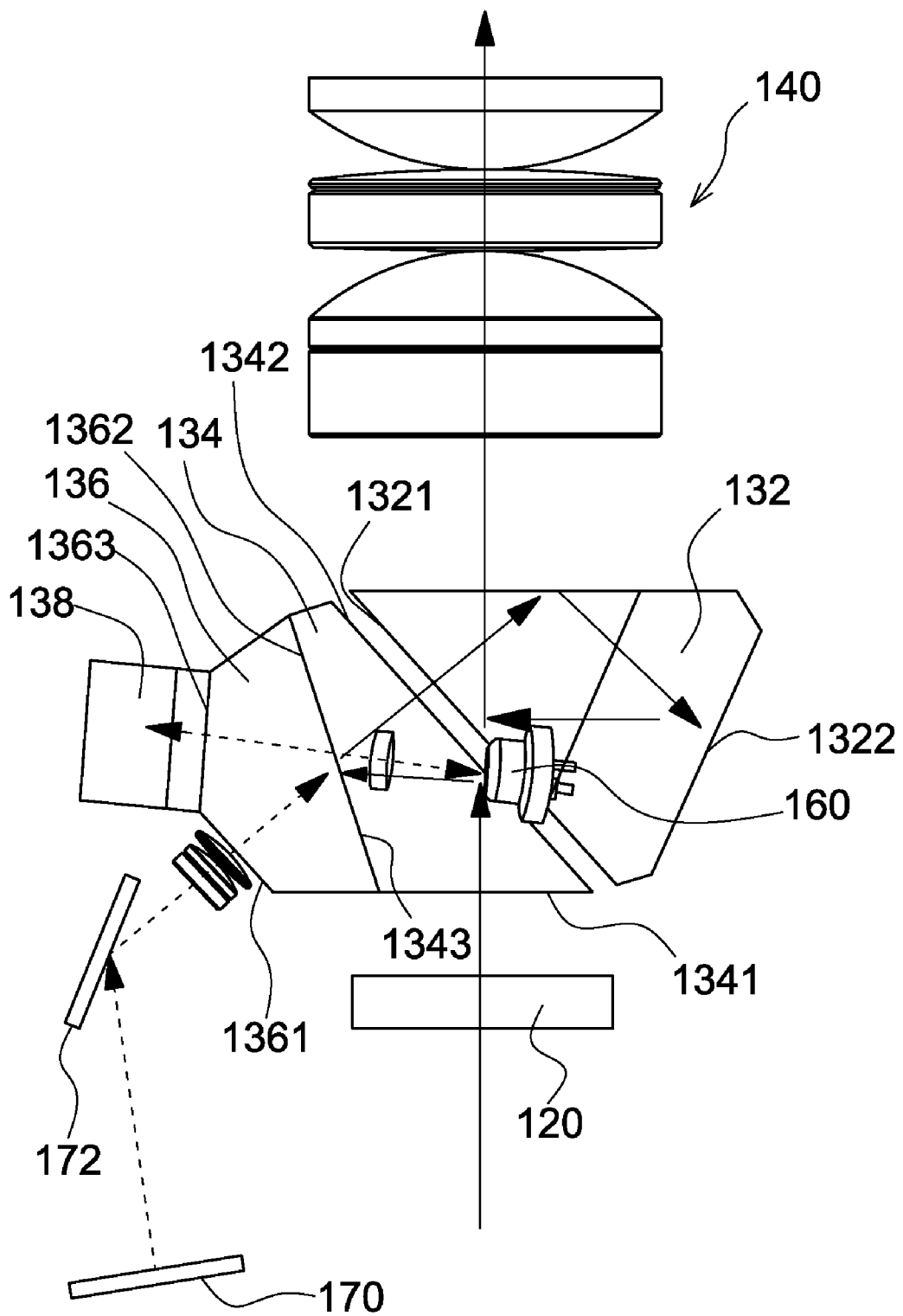
FIG. 5 is an enlargement view of part X in FIG. 3.
Figure 6:
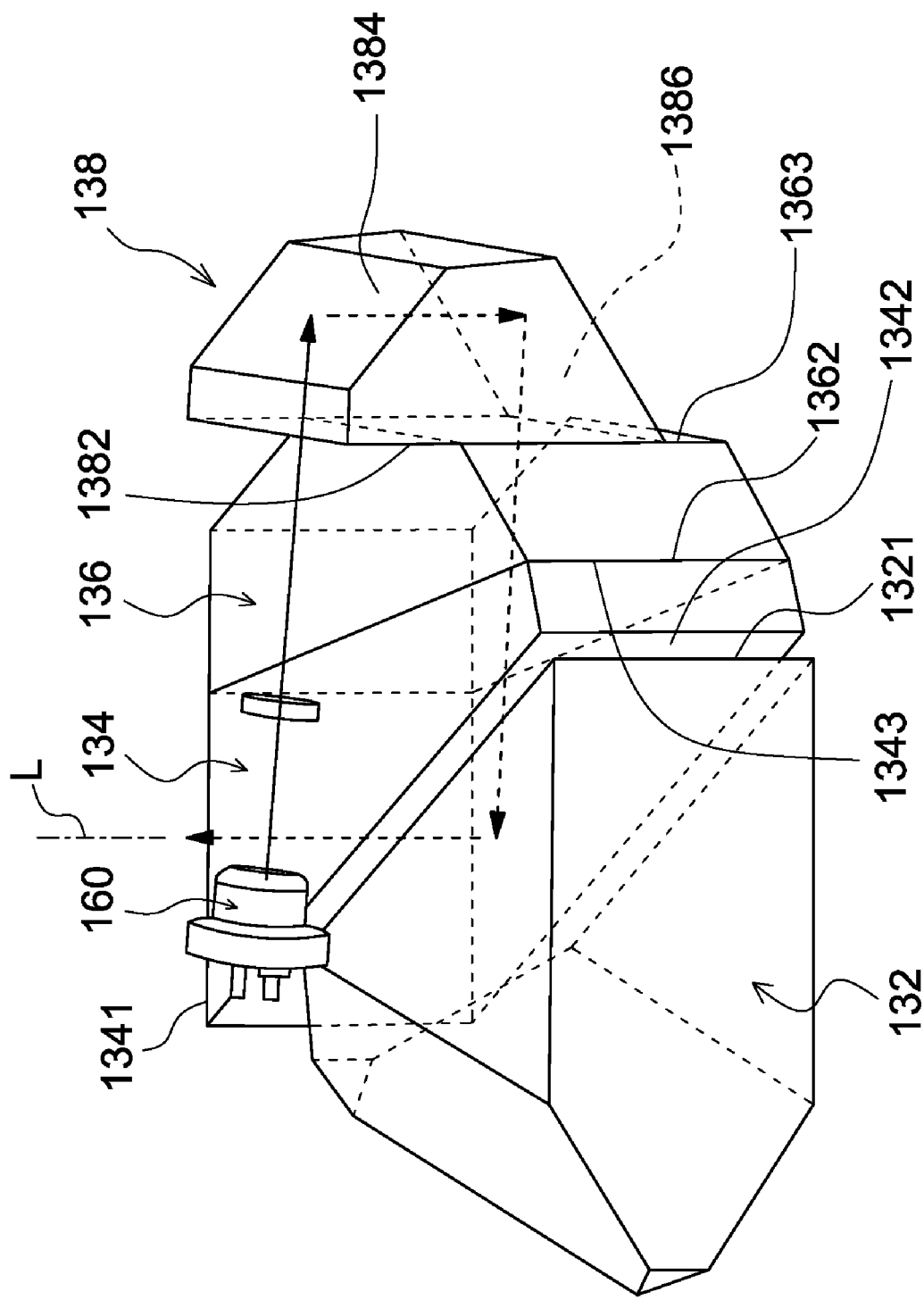
FIG. 6 is a perspective view of part Y in FIG. 3.

FIGS. 4-6 depict the structure of the binocular for measuring distance. The prism module 130 includes a roof prism 132, a first prism 134, a second prism 136 and a third prism 138. In the present embodiment, the first prism 134 is a quadrangle prism which includes a first surface 1341, a second surface 1342 and a third surface 1343. The roof prism 132 includes a fourth surface 1321 and a roof surface 1322. The second prism 136 is a pentagon prism which includes a fifth surface 1361, a sixth surface 1362 adjacent to the third surface 1343 of the first prism 134, and a seventh surface 1363. The third prism is a triangular prism which includes a light access surface 1382, a first reflecting surface 1384 and a second reflecting surface 1386. The fourth surface 1321 of the roof prism 132 is adjacent to the second surface 1342 of the first prism 134. The roof prism 132 and the first prism 134 constitute a Schhmidt-Pechan prism to transform the image of the visible light beams into the erect image. The path along which the visible light beam travels is shown in FIG. 5, wherein the visible light beam enters the first prism 134 through the first surface 1341, is reflected a plurality of times in the first prism 134, leaves the first prism 134 through the second surface 1342, enters the roof prism 132 through the fourth surface 1321, and is reflected a plurality of times in the roof prism 132 so that the image of the visible light beams is transformed into the erect image.

The light source 160 is disposed above the Schhmidt-Pechan prism. In operation, an invisible light beam (such as infrared) emitted by the light source 160 enters the third prism 138 through the light access surface 1382, is reflected by the first reflecting surface 1384 and the second reflecting surface 1386, enters the second prism 136 through the seventh surface 1363, passes through the second prism 136, and enters the first prism 134. A coating disposed on the second surface 1342 of the first prism 134 is configured to reflect the invisible light beam and allow a visible light beam to pass through. Therefore, the invisible light beam in the first prism 134 is reflected by the coating on the second surface 1342, passes through the objective module 110, and is projected forward. As shown in FIG. 6, the invisible light beam leaves the prism module 130 in a direction parallel to a baseline L which passes through the first surface 1341 and the second surface 1342 of the first prism 134 and the fourth surface 1321 of the roof prism 132. Moreover, as shown in FIGS. 3 and 5, an organic light-emitting diode 170 is configured to produce a light beam containing an image. The light beam containing the image is reflected by a reflecting mirror 172, enters the second prism 136 through the fifth surface 1361, leaves the second prism 136 through the sixth surface 1362, passes through the first prism 134, enters the roof prism 132, is reflected by the roof surface 1322 and the fourth surface 1321, and leaves the roof prism 132, and the image of the light beam can be observed through the ocular module 140.

As shown in FIG. 3, the described invisible light beam is reflected by an object, enters the prism module 230 through the objective module 210 of the second optical system 200, enters a first prism 234, is reflected by a second surface 2342, passes through a second prism 236, and is received by the light receiver 260. The distance from the binocular 1000 to the object is calculated after the light receiver 260 receives the invisible light beam.

In the present embodiment, the structure of the prism module 230 is similar to that of the prism module 130. The prism module 230 includes a roof prism 232, the first prism 234 and the second prism 236. Similarly, the combination of the roof prism 232 and the first prism 234 is a Schhmidt-Pechan prism. Therefore, an image of a visible light beam passing through the second optical system 200 is transformed into an erect image by the Schhmidt-Pechan prism (The light path of the visible light beam in the prism 230 is similar to that in the prism 130 and therefore the descriptions thereof are omitted). However, it is noted that the prism module 230 does not have the third prism. In operation, the light beam reflected by the object is reflected by the second surface 2342 of the quadrangle prism 234, is reflected by the second prism 236, and is received by the light receiver 260.

In the present embodiment, the light source 160 is a laser diode, and the light receiver 260 is an avalanche photodiode.

In a second embodiment, the positions of the light source 160 and the light receiver 260 are exchanged. Thus, the light receiver 260 is disposed above or below the Schhmidt-Pechan prism of the first optical system 100.

Figure 7:
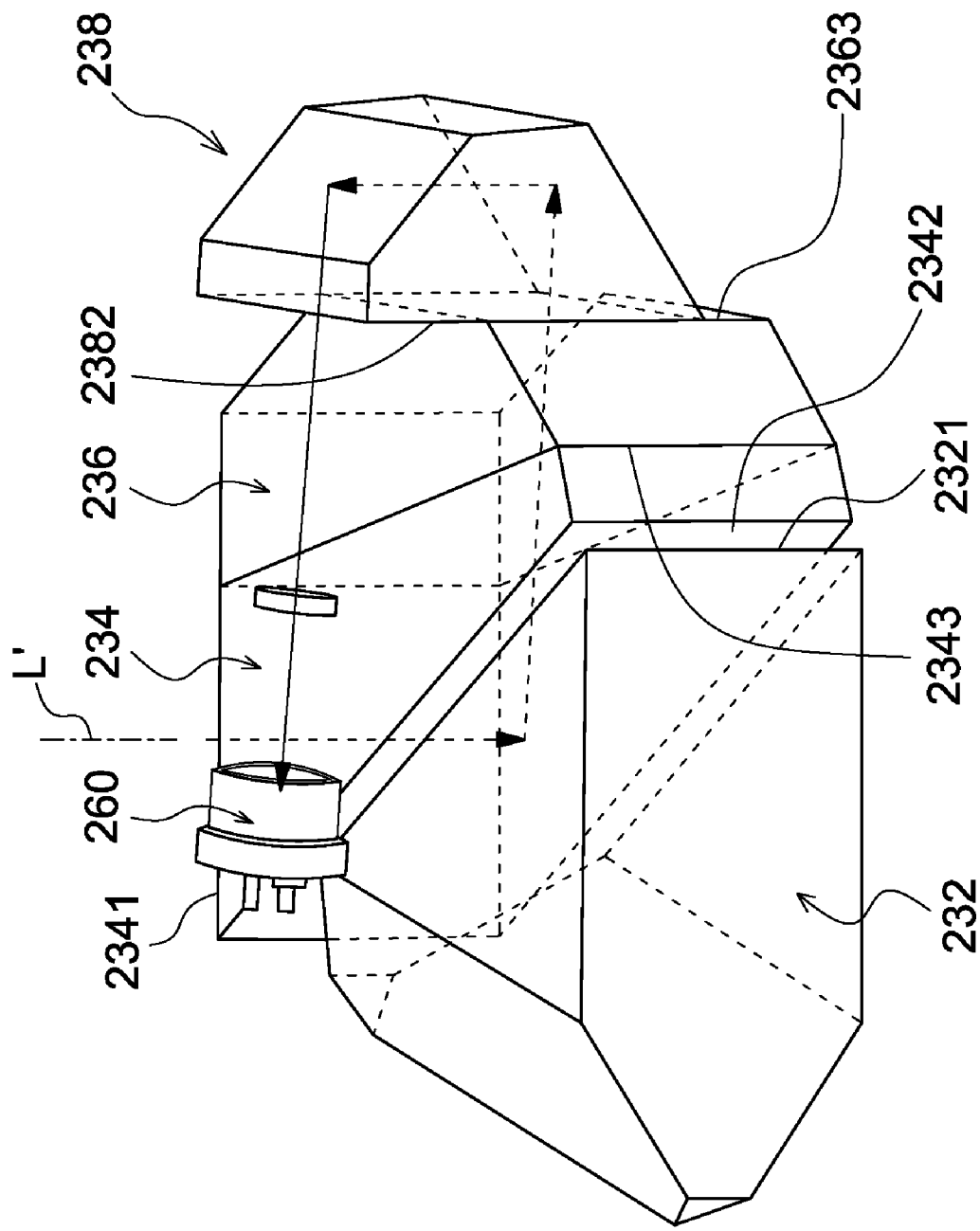
FIG. 7 is a perspective view of a binocular capable of measuring distance in accordance with a third embodiment of the invention, wherein the prism module of the second optical system includes a third prism.

In a third embodiment, the prism module 230 has the same structure as the prism module 130. That is, the prism module 230 has a third prism 238, and the light receiver 260 is disposed above or below the Schhmidt-Pechan prism. As shown in FIG. 7, a baseline L' passes through the first surface 2341 and the second surface 2342 of the first prism 234 and the fourth surface 2321 of the roof prism 232. A light beam reflected by an object enters the first prism 234 through the first surface 2341 in a direction parallel to the baseline L', is reflected by the first prism 234, enters the second prism 236 through the third surface 2343, passes through the seventh surface 2363 of the second prism 236, enters the third prism 238 through the light access surface 2382, is reflected by the third prism 238, leaves the third prism 238 through the light access surface 2382, and enters the light receiver 260. It is noted that the baseline L' is parallel to an optical axis passing through the objective module 210 and ocular module 240.

In a fourth embodiment, the prism module 230 has the third prism, and the light receiver 260 is disposed above or below the Schhmidt-Pechan prism. However, the prism module 130 does not have the third prism.

In a fifth embodiment, the organic light-emitting diode is disposed in the second optical system 200, and the first optical system 100 does not have the organic light-emitting diode. The path along which the light beam containing an image travels in the prism module 230 is similar to that in the prism 130 in the above embodiment, and therefore the descriptions thereof are omitted.

FIGS. 8-11 depict the structure of the prism and light transmitter module 310 of FIG. 2 in accordance with a sixth embodiment of the invention. In the sixth embodiment, the first optical system 100 is provided with the prism holder 306 and the fixing assembly 320, wherein the prism module 130 is disposed within the prism holder 306, and the light transmitter module 330 is connected to the prism holder 306 through the fixing assembly 320.

Figure 10:
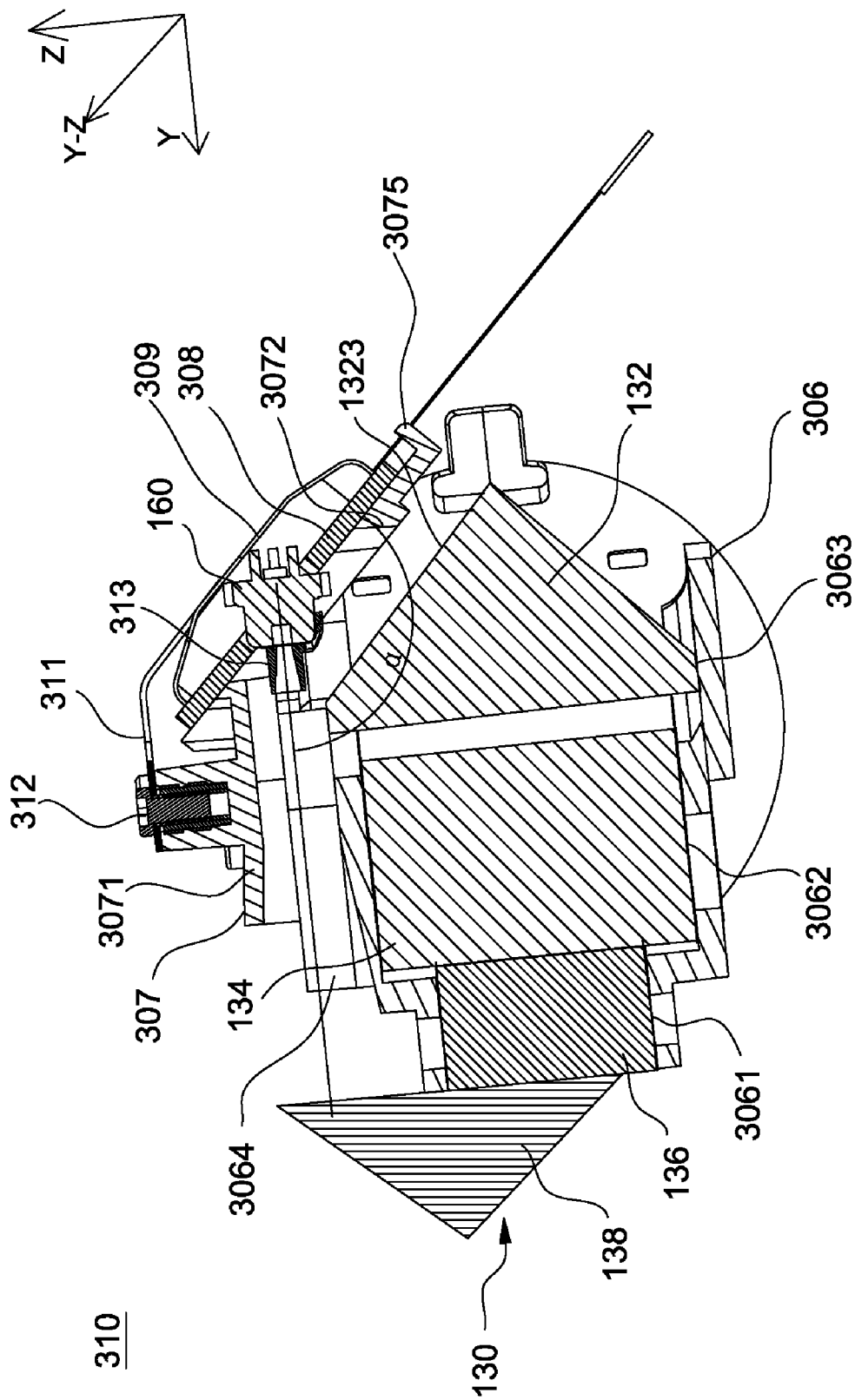
FIG. 10 is a sectional view taken along line A-A of the FIG. 9.

As shown in FIG. 10, the prism holder 306 includes a plurality of mounting holes for mounting the prism module 130 within the prism holder 306. The mounting holes include a first mounting hole 3061, a second mounting hole 3062, and a third mounting hole 3063. To assemble the prism holder 306 and the prism module 130, the second prism 136 is disposed within the first mounting hole 3061. The third prism 138 is adjacent to the second prism 136. Therefore, the third prism 138 is exposed outside the first mounting hole 3061, and is partly higher than the prism holder 306 for receiving the invisible light beam emitted by the light source 160. The first prism 134 is disposed within the second mounting hole 3062. The roof prism 132 includes an inclined plane 1323. As the roof prism 132 is disposed within the third mounting hole 3063, the inclined plane 1323 is exposed.

Figure 8:
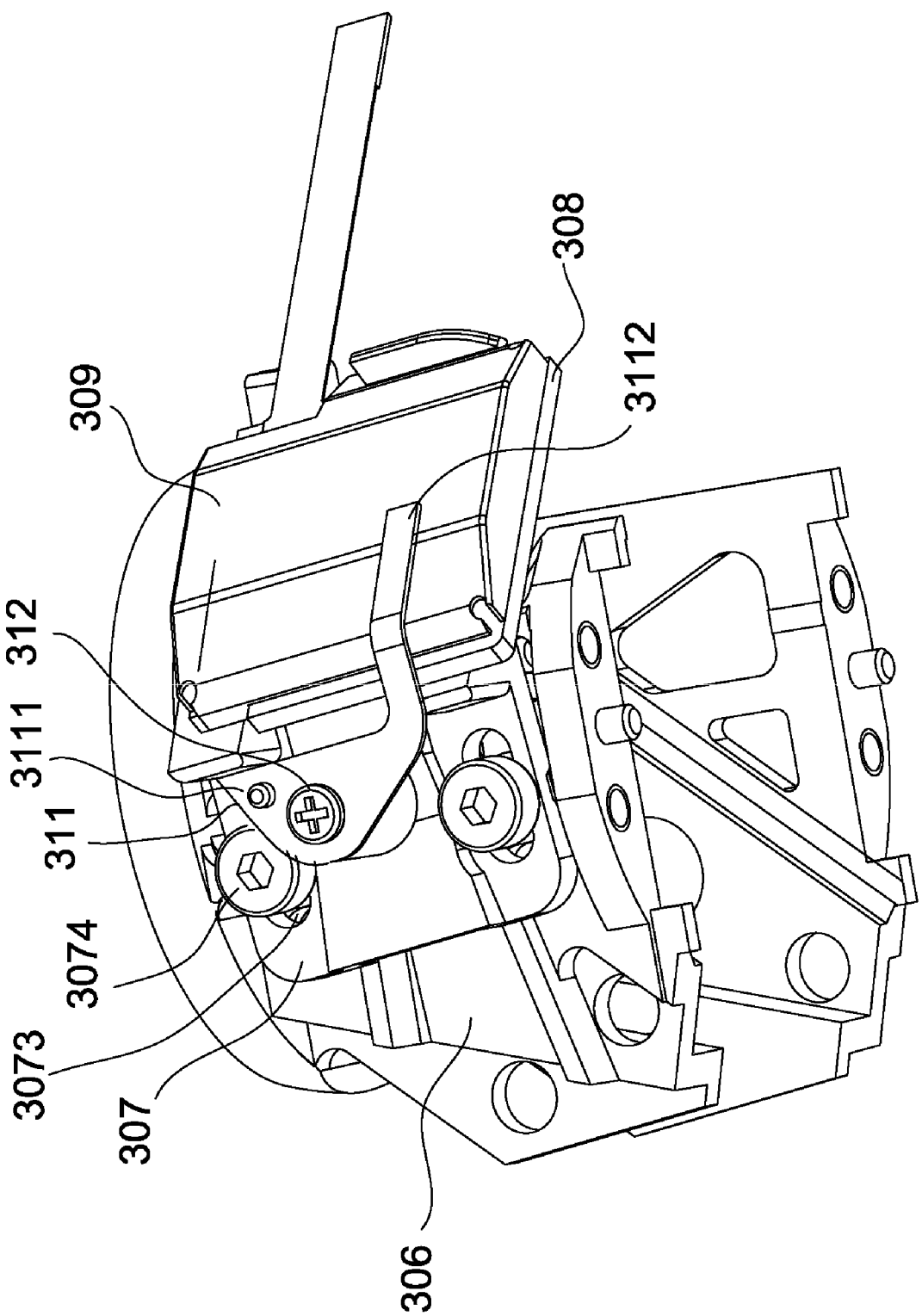
FIG. 8 is a perspective view of a prism and light transmitter module in accordance with a sixth embodiment of the invention.
Figure 9:
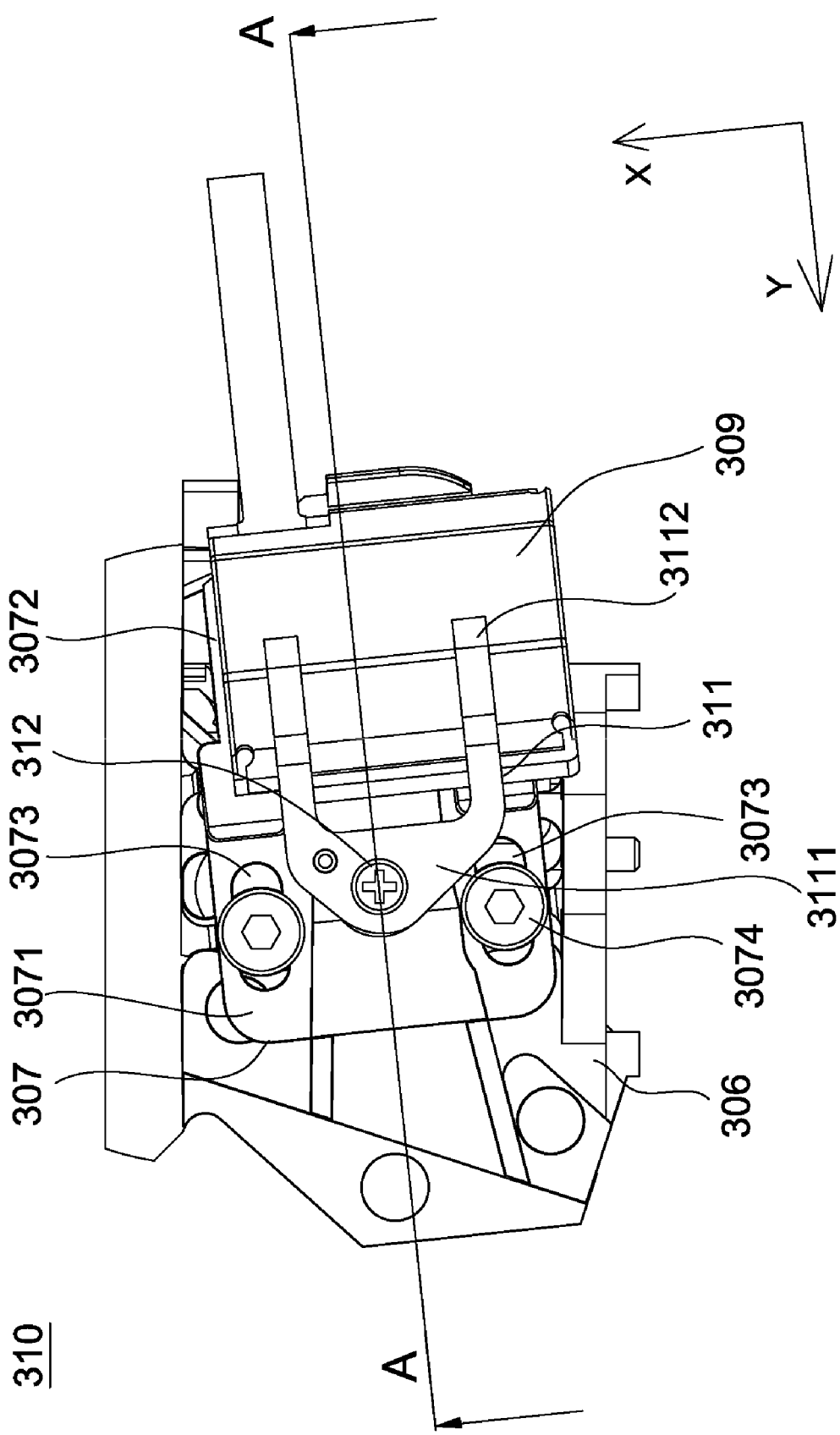
FIG. 9 is a top view of the prism and light transmitter module of FIG. 8.
Figure 11:
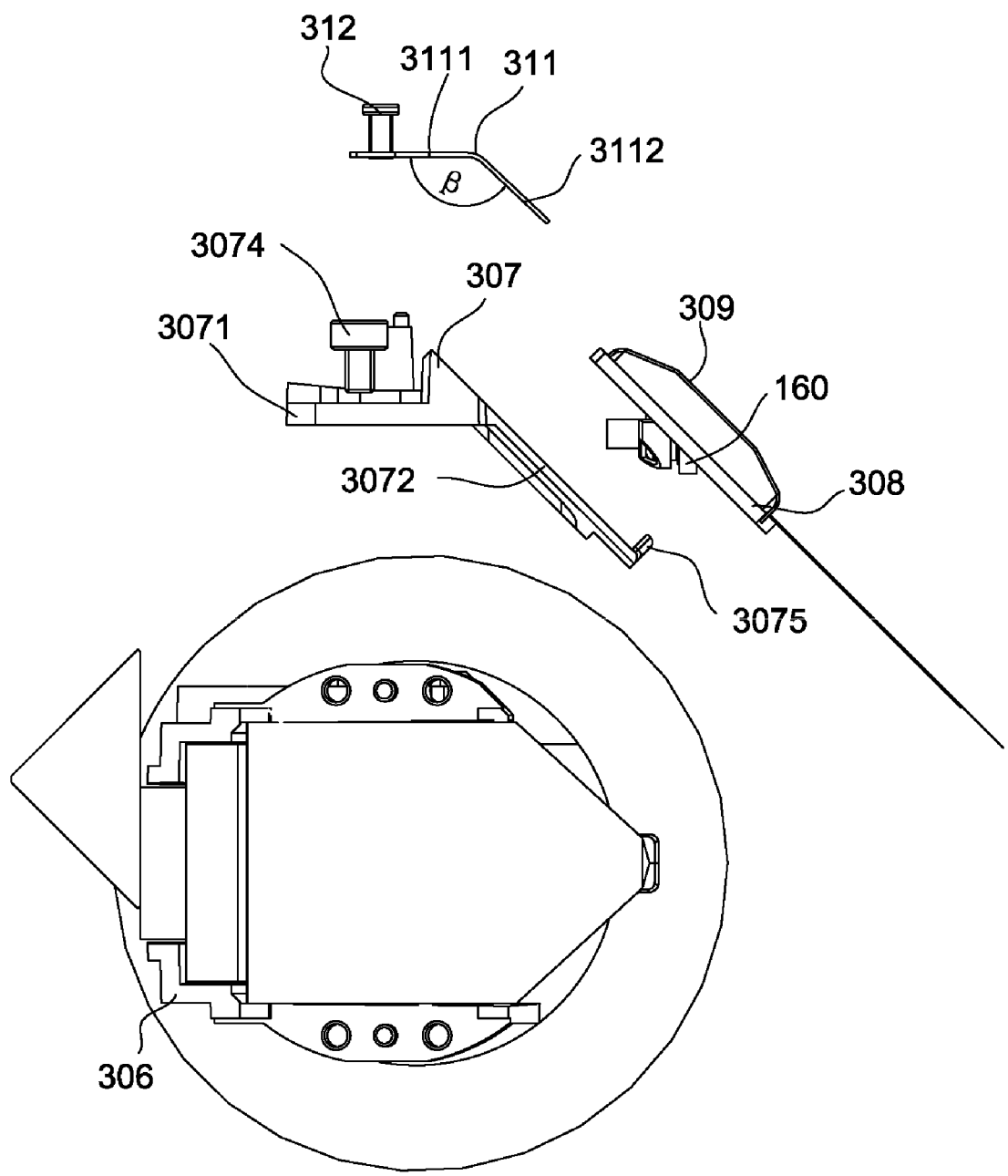
FIG. 11 is an exploded view of the prism and light transmitter module of FIG. 10.

The fixing assembly 320 includes a base 307 and an elastic plate 311. The base 307 connects to the prism holder 306, and the elastic plate 311 connects to the base 307. As shown in FIGS. 9-10, the base 307 includes a connecting part 3071 and a supporting part 3072. The connecting part 3071 intersects with the supporting part 3072 at a first angle α, and the first angle α ranges from 90 to 170 degrees. A direction of the invisible light beam traveling from the light source 160 to the prism module 130 is defined as a light axis Y. Two slots 3073 are disposed on the connecting part 3071 and extend in a direction parallel to the light axis Y, and two connecting holes (not shown) are correspondingly disposed on the prism holder 306. Two connecting members 3074 pass through the slots 3073, and are disposed in the connecting holes respectively so as to connect the base 307 to the prism holder 306. The connecting part 3071 extends substantially in the direction parallel to the light axis Y, and the supporting part 3072 is parallel to the inclined plane 1323 of the roof prism 132. In the present embodiment, the connecting member 3074 is screw. As shown in FIGS. 8-9 and 11, the elastic plate 311 includes a fixing part 3111 and a free part 3112, and the fixing part 3111 intersects with the free part 3112 at a second angle β. It is noted that when the elastic plate 311 comes to a free state, the second angle β is smaller than the first angle α. The fixing part 3111 of the elastic plate 311 connects to the base 307 through a connecting member 312 so that the fixing part 3111 is parallel to the light axis Y, and the free part 3112 presses on the light transmitter module 330. It is also noted that at least two free parts 3112 are provided for further stably pressing on the light transmitter module 330.

As shown in FIG. 10, the light transmitter module 330 further includes a drive circuit board 308 and a shield 309. The drive circuit board 308 is disposed above the inclined plane 1323, and the light source 160 is welded on and driven by the drive circuit board 308. The shield 309 is welded on the drive circuit board 308, and covers the light source 160 so as to prevent the electromagnetic interference (EMI) generated by the light source 160, wherein the shield 309 can be formed by pressing metal (e.g. copper) or can be made of EMI shielding fabric. Specifically, as the free part 3112 presses on the light transmitter module 330, the elastic plate 311 deforms and generates an elastic force so that the shield 309 and the drive circuit board 308 are firmly disposed on the supporting part 3072 through the elastic force. The light source 160 includes a pin (not shown). It is noted that the pins of the light source 160 are not perpendicularly welded onto the drive circuit board 308. Rather, the pins of the light source 160 are bent to be welded onto the drive circuit board 308. Such an arrangement ensures that the invisible light beam emitted by the light source 160 travels along the light axis Y, and the drive circuit board 308 intersects with the light axis Y at the first angle α. An edge of the inclined plane 1323, which is close and parallel to the drive circuit board 308, also intersects with the light axis Y at the first angle α. In other words, a gap between the drive circuit board 308 and the roof prism 132 is uniform when observed in a direction Y-Z. It is also noted that when the first angle α ranges from 130 to 140 degrees and the edge is parallel to the drive circuit board 308, a limited space within the binocular 1000 can be maximally utilized.

In the present embodiment, the supporting part 3072 includes a hole (not shown) disposed thereon. When the drive circuit board 308 is disposed on the supporting part 3072, the light source 160 is exposed through the hole. The prism holder 306 further includes a light beam channel 3064 disposed in front of the light source 160 and extending in the direction parallel to the light axis Y so that the invisible light beam emitted by the light source 160 can enter the third prism 138 through the light beam channel 3064. As shown in FIG. 10, the light transmitter module 310 further includes a lens hood 313 connecting to the light source 160. The lens hood 313 includes a hole which is tapered with a small end next to the light source 160 so as to prevent nearby prisms from a stray light beam emitted by the light source 160. As shown in FIGS. 10-11, the supporting part 3072 further includes a flange 3075 disposed at a lower end thereof and extending perpendicularly from the lower end. It is noted that the drive circuit board 308 is disposed on the supporting part 3072 and has contact with the flange 3075 so that the drive circuit board 308 is stably disposed.

It is worth noted that with the help of the prism holder 306 and the fixing assembly 320, the user is capable of adjusting the position of the light source 160 with respect to the prism module 130 in the X, Y, and Z directions so as to change the focus length. In practical operation, the position of the light source 160 can be adjusted in accordance with the following ways: since the light transmitter module 330 is fixed only by the elastic plate 311 and the supporting part 3072, a holding fixture can be additionally used to hold the light transmitter module 330 that facilitates movement of the light transmitter module 330 in the X direction (as shown in FIG. 9) or Y-Z direction (as shown in FIG. 10). Alternatively, the connecting members 3074 are slightly released so that the base 307 is movable along the slot 3073, and the base 307 is moved with the light transmitter module 330 on the supporting part 3072 moved together in the Y direction as shown in FIGS. 9-10. After the adjustment is finished, the connecting member 3074 is tightened so that the position of the light source 160 is fixed and the desired focus length is obtained.

While the prism holder 306 and fixing assembly 320 provided in the first optical system 100 are described in the sixth embodiment, it is to be understood that the invention is not limited thereto. In a seventh embodiment, the prism module 230 has the same structure as that shown in FIG. 7 so that the structure of the prism and light transmitter module 310 described in the sixth embodiment can be applied to that of the second optical system 200 so as to operate the light receiver 260 (or light transmitter module 630) and the prism module 230. In brief, at least one of the first optical system 100 and the second optical system 200 includes the prism and light transmitter module described above.

In the described binocular, the light source and light receiver for measuring distance can be disposed above or below the prism module, because a third prism is provided in the prism module. Such an arrangement provides an additional space for mounting an organic light-emitting diode. Therefore, the product (binocular) can be diversified. Besides, the light source (or light receiver) is disposed above or below the prism module through the prism holder and the fixing assembly for constituting the prism and light transmitter module, so that the limited space within the binocular can be maximally utilized for accommodating the drive circuit board and the shield, and the position of the light source (or light receiver) are adjustable for changing the focus length.

What is claimed is:

1. A prism and light transmitter module, comprising:
  a prism holder;
  a light transmitter comprising a pin, and configured to emit or receive a first light beam along a light axis;
  a prism module comprising an inclined plane, wherein the prism module is disposed within the prism holder with the inclined plane exposed, and the first light beam enters and leaves the prism module;
  a drive circuit board disposed above the inclined plane, and intersecting with the light axis at a first angle, wherein the pin is bent so as to connect the light transmitter to the drive circuit board;
  a shield disposed on the drive circuit board; and
  a fixing assembly connecting to the prism holder, configured to fix the drive circuit board, and comprising a hole through which the light transmitter is exposed,
  wherein the fixing assembly comprises an elastic plate and a base, the elastic plate comprises a fixing part connecting to the base and a free part pressing the shield, and the base connects to the prism holder.

2. The prism and light transmitter module as claimed in claim 1, wherein the fixing assembly comprises:
  a base connecting to the prism holder and comprising a connecting part and a supporting part, wherein the connecting part extends in a direction parallel to the light axis, the supporting part intersects with the connecting part at the first angle, and the drive circuit board is disposed on the supporting part.

3. The prism and light transmitter module as claimed in claim 2, wherein the fixing assembly further comprises:
  an elastic plate comprising a fixing part connecting to the base and a free part pressing the shield.

4. The prism and light transmitter module as claimed in claim 2, further comprising at least one connecting member, wherein the connecting part comprises at least one slot, and the connecting member passes through the slot and is disposed on the prism holder so as to connect the base to the prism holder.

5. The prism and light transmitter module as claimed in claim 4, wherein the slot extends in the direction parallel to the light axis.

6. The prism and light transmitter module as claimed in claim 2, wherein the hole is disposed on the supporting part.

7. The prism and light transmitter module as claimed in claim 6, wherein the prism holder comprises a light beam channel disposed in front of the light transmitter and extending in the direction parallel to the light axis.

8. The prism and light transmitter module as claimed in claim 2, wherein the base further comprises a flange disposed at the lower end of the supporting part and having contact with the drive circuit board.

9. The prism and light transmitter module as claimed in claim 1, wherein the inclined plane comprises an edge close and parallel to the drive circuit board.

10. The prism and light transmitter module as claimed in claim 1, wherein the prism module comprises a roof prism having the inclined plane.

11. The prism and light transmitter module as claimed in claim 10, wherein the prism module further comprises a third prism exposed outside the prism holder so as to receive the first light beam emitted by the light transmitter or reflect the first light beam to the light transmitter.

12. The prism and light transmitter module as claimed in claim 1, wherein the prism module comprises a third prism exposed outside the prism holder so as to receive the first light beam emitted by the light transmitter or reflect the first light beam to the light transmitter.

13. The prism and light transmitter module as claimed in claim 1, wherein the first angle ranges from 90 to 170 degrees.

14. A binocular capable of measuring distance comprising:
- a first optical system; and
- a second optical system;
- wherein at least one of the first optical system and the second optical system comprises an ocular module, the prism and light transmitter module as claimed in claim 1, and an objective module.

15. The binocular capable of measuring distance as claimed in claim 14, wherein the prism module further comprising:
- a first prism comprising a first surface, a second surface and a third surface;
- a roof prism comprising the inclined plane, a roof surface and a fourth surface adjacent to the second surface;
- a second prism comprising a fifth surface, a sixth surface adjacent to the third surface, and a seventh surface; and
- a third prism disposed higher than the second prism;
- wherein the third prism comprises a light access surface, a first reflecting surface and a second reflecting surface, and the light access surface is partly adjacent to the seventh surface;
- wherein a baseline is configured to pass through the first and the second surfaces of the first prism and the fourth surface of the roof prism;
- wherein a light source is disposed above the second prism, near a side of the third prism, and adjacent to the first and the roof prisms;
- wherein the light source is configured to emit the first light beam;
- wherein the first light beam enters the third prism, is reflected by the third prism, enters the second prism through the seventh surface, passes through the sixth surface of the second prism, enters the first prism through the third surface, is reflected by the second surface of the first prism, and leaves the prism module;
- wherein the first light beam leaving the prism module is parallel to the baseline.

16. The binocular capable of measuring distance as claimed in claim 14, wherein the prism module further comprising:
- a first prism comprising a first surface, a second surface and a third surface;
- a roof prism comprising the inclined plane, a roof surface and a fourth surface adjacent to the second surface;
- a second prism comprising a fifth surface, a sixth surface adjacent to the third surface, and a seventh surface; and
- a third prism disposed higher than the second prism;
- wherein the third prism comprises a light access surface, a first reflecting surface and a second reflecting surface, and the light access surface is partly adjacent to the seventh surface;
- wherein a baseline is configured to pass through the first and the second surfaces of the first prism and the fourth surface of the roof prism;
- wherein a light receiver is disposed above the second prism, near a side of the third prism, and adjacent to the first and the roof prisms;
- wherein the first light beam parallel to the baseline enters the first surface of the first prism, is reflected by the first prism, enters the second prism through the third surface, passes through the seventh surface of the second prism, enters the third prism through the light access surface, is reflected by the third prism to leave the prism module through the light access surface, and enters the light receiver.

17. A prism and light transmitter module comprising:
- a prism holder;
- a light transmitter comprising a pin, and configured to emit or receive a first light beam along a light axis;
- a prism module comprising an inclined plane, wherein the prism module is disposed within the prism holder with the inclined plane exposed, and the first light beam enters and leaves the prism module;
- a drive circuit board disposed above the inclined plane, and intersecting with the light axis at a first angle, wherein the pin is bent so as to connect the light transmitter to the drive circuit board;
- a shield disposed on the drive circuit board; and
- a fixing assembly connecting to the prism holder, configured to fix the drive circuit board, and comprising a hole through which the light transmitter is exposed,
- wherein the prism module comprises a third prism exposed outside the prism holder so as to receive the first light beam emitted by the light transmitter or reflect the first light beam to the light transmitter.

18. A binocular capable of measuring distance comprising:
- a first optical system; and
- a second optical system;
- wherein at least one of the first optical system and the second optical system comprises an ocular module, a prism and light transmitter module, and an objective module;
- wherein the prism and light transmitter module comprises a prism holder, a light transmitter, a prism module, a drive circuit board, a shield, and a fixing assembly;
- wherein the light transmitter comprises a pin, and is configured to emit or receive a first light beam along a light axis;
- wherein the prism module comprises an inclined plane, the prism module is disposed within the prism holder with the inclined plane exposed, and the first light beam enters and leaves the prism module;
- wherein the drive circuit board is disposed above the inclined plane and intersects with the light axis at a first angle, and the pin is bent so as to connect the light transmitter to the drive circuit board;
- wherein the shield is disposed on the drive circuit board;
- wherein the fixing assembly connects to the prism holder, is configured to fix the drive circuit board, and comprises a hole through which the light transmitter is exposed;
- wherein the prism module further comprising:
- a first prism comprising a first surface, a second surface and a third surface;
- a roof prism comprising the inclined plane, a roof surface and a fourth surface adjacent to the second surface;

a second prism comprising a fifth surface, a sixth surface adjacent to the third surface, and a seventh surface; and a third prism disposed higher than the second prism;

wherein the third prism comprises a light access surface, a first reflecting surface and a second reflecting surface, and the light access surface is partly adjacent to the seventh surface;

wherein a baseline is configured to pass through the first and the second surfaces of the first prism and the fourth surface of the roof prism;

wherein a light source is disposed above the second prism, near a side of the third prism, and adjacent to the first and the roof prisms;

wherein the light source is configured to emit the first light beam;

wherein the first light beam enters the third prism, is reflected by the third prism, enters the second prism through the seventh surface, passes through the sixth surface of the second prism, enters the first prism through the third surface, is reflected by the second surface of the first prism, and leaves the prism module;

wherein the first light beam leaving the prism module is parallel to the baseline.

19. The prism and light transmitter module as claimed in claim 18, wherein the fixing assembly comprises an elastic plate and a base, the elastic plate comprises a fixing part connecting to the base and a free part pressing the shield, and the base connects to the prism holder.

20. A binocular capable of measuring distance comprising:

a first optical system; and a second optical system;

wherein at least one of the first optical system and the second optical system comprises an ocular module, a prism and light transmitter module, and an objective module;

wherein the prism and light transmitter module comprises a prism holder, a light transmitter, a prism module, a drive circuit board, a shield, and a fixing assembly;

wherein the light transmitter comprises a pin, and is configured to emit or receive a first light beam along a light axis;

wherein the prism module comprises an inclined plane, the prism module is disposed within the prism holder with the inclined plane exposed, and the first light beam enters and leaves the prism module;

wherein the drive circuit board is disposed above the inclined plane and intersects with the light axis at a first angle, and the pin is bent so as to connect the light transmitter to the drive circuit board;

wherein the shield is disposed on the drive circuit board;

wherein the fixing assembly connects to the prism holder, is configured to fix the drive circuit board, and comprises a hole through which the light transmitter is exposed;

wherein the prism module further comprising:

a first prism comprising a first surface, a second surface and a third surface;

a roof prism comprising the inclined plane, a roof surface and a fourth surface adjacent to the second surface;

a second prism comprising a fifth surface, a sixth surface adjacent to the third surface, and a seventh surface; and a third prism disposed higher than the second prism;

wherein the third prism comprises a light access surface, a first reflecting surface and a second reflecting surface, and the light access surface is partly adjacent to the seventh surface;

wherein a baseline is configured to pass through the first and the second surfaces of the first prism and the fourth surface of the roof prism;

wherein a light receiver is disposed above the second prism, near a side of the third prism, and adjacent to the first and the roof prisms;

wherein the first light beam parallel to the baseline enters the first surface of the first prism, is reflected by the first prism, enters the second prism through the third surface, passes through the seventh surface of the second prism, enters the third prism through the light access surface, is reflected by the third prism to leave the prism module through the light access surface, and enters the light receiver.

* * * * *